United States Patent
Liu et al.

(10) Patent No.: US 9,479,639 B2
(45) Date of Patent: Oct. 25, 2016

(54) DUAL-MODE AND DUAL-STANDBY MOBILE TERMINAL AND DUAL-CHANNEL IMPLEMENTATION METHOD THEREOF

(71) Applicant: ZTE Corporation, Shenzhen (CN)

(72) Inventors: Lizhang Liu, Shenzhen (CN); Tao Xue, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/420,682

(22) PCT Filed: Jul. 17, 2013

(86) PCT No.: PCT/CN2013/079526
§ 371 (c)(1),
(2) Date: Feb. 10, 2015

(87) PCT Pub. No.: WO2013/178147
PCT Pub. Date: Dec. 5, 2013

(65) Prior Publication Data
US 2015/0222748 A1    Aug. 6, 2015

(30) Foreign Application Priority Data

Aug. 10, 2012 (CN) .......................... 2012 1 0284381

(51) Int. Cl.
*H04M 1/00* (2006.01)
*H04M 3/428* (2006.01)
(Continued)

(52) U.S. Cl.
CPC .......... *H04M 3/4288* (2013.01); *H04M 3/4283* (2013.01); *H04W 4/16* (2013.01); *H04W 76/026* (2013.01); *H04W 88/06* (2013.01)

(58) Field of Classification Search
CPC .... H04W 88/06; H04W 48/18; H04W 88/10
USPC ........................................................ 455/552.1
See application file for complete search history.

(56) References Cited

U.S. PATENT DOCUMENTS

2007/0058579 A1*  3/2007  Xu .................... H04M 7/0057
                                                          370/328
2008/0090605 A1*  4/2008  Park .................. H04W 88/06
                                                          455/552.1
(Continued)

FOREIGN PATENT DOCUMENTS

CN         1520133 A        8/2004
CN         1604661 A        4/2005
(Continued)

OTHER PUBLICATIONS

International Search Report of PCT/CN2013/079526, dated Oct. 17, 2013.
(Continued)

*Primary Examiner* — Omoniyi Obayanju
(74) *Attorney, Agent, or Firm* — Banner & Witcoff, Ltd.

(57) ABSTRACT

A dual-mode and dual-standby mobile terminal and a dual-channel implementation method thereof, and the dual-mode and dual-standby mobile terminal includes a first mode radio frequency transceiver, a second mode radio frequency transceiver, a first mode baseband chip connected to the first mode radio frequency transceiver, and a second mode baseband chip connected to the second mode radio frequency transceiver, and the mobile terminal further includes: a call processing module, which is connected to both the first mode baseband chip and the second mode baseband chip and used to perform fake call waiting processing on a call in active state in the first mode before proactively switching to a first call in a second mode when determining that there are two calls in the first mode or passively answering a second call in the second mode when determining that there are two calls in the first mode.

14 Claims, 2 Drawing Sheets

(51) Int. Cl.
*H04W 76/02* (2009.01)
*H04W 4/16* (2009.01)
*H04W 88/06* (2009.01)

(56) References Cited

U.S. PATENT DOCUMENTS

2008/0227483 A1 9/2008 Kuhl et al.
2009/0040951 A1* 2/2009 Buckley .............. H04W 76/025
370/310

FOREIGN PATENT DOCUMENTS

EP    1763276 A2    3/2007
WO    2005/101887 A1    10/2005
WO    2008/028320 A1    3/2008

OTHER PUBLICATIONS

Supplementary European Search Report of EP 13797939, dated Nov. 18, 2015.

* cited by examiner

DUAL-MODE AND DUAL-STANDBY MOBILE TERMINAL AND DUAL-CHANNEL IMPLEMENTATION METHOD THEREOF

TECHNICAL FIELD

The present document relates to the field of communications, and more particularly, to a dual-mode and dual-standby mobile terminal and a dual channel implementation method thereof.

BACKGROUND

In the existing mobile communication terminals, terminals with dual-mode, dual-card and dual-standby functions have gradually appeared because local number portability (LNP) is not offered to users and users do not want to discard the old number. But due to the issue that the current Code Division Multiple Access (CDMA) and Global System for Mobile communications (GSM) cannot support multiple channels of call waiting, there is no full-sense CDMA&GSM/wideband Code Division Multiple Access (WCDMA) dual-mode, dual-card and dual-standby mobile communication terminals in the market yet.

From the technical implementation standpoint, there are currently mainly the following two CDMA and GSM/WCDMA dual-mode, dual-card and dual-standby terminal implementation schemes in the market.

The first one is implemented by using one set of chipsets, that is, there is only one set of baseband chips and radio frequency chips in the phone, the radio frequency chips detect the CDMA and GSM/WCDMA network signals with the polling method to achieve the dual-mode, dual-card and dual-standby, but this physical restriction on hardware cause that it can only achieve a single channel under the two network modes, that is, when there is a call in progress in either mode, no call can be dialed out or no new incoming call can be answered in the other mode.

The second one is implemented by using two sets of chipsets, that is, the mobile phone is equipped with two sets of baseband chips and radio frequency chips, which is equivalent to combine two entire mobile phone motherboards together and place them in the same mobile phone housing. Such an implementation can support both User Identity Model (UIM) and Subscriber Identity Module (SIM)/Universal Subscriber Identity Module (USIM) working simultaneously. However, even for the terminals using two sets of baseband chips and radio frequency chips in the current market, they basically just realize the simplest dual-channel, that is, when there is a call in progress in either mode, if a call needs to be dialed out or a new incoming call needs to be answered in the other mode, the call in progress in the previous mode must be hung up.

In short, the CDMA and GSM/WCDMA dual-mode and dual-standby mobile terminals implemented in the related art have the following limitations:

although terminals implemented with the abovementioned first scheme achieve the dual-standby function, but the dual-channel cannot be achieved, when there is a call in progress in either mode, the other mode cannot work, and a call can be easily missed; and although terminals implemented with the abovementioned second scheme achieve the dual-standby and dual-channel function, such terminals only realize the simplest dual-channel, but do not support calling in both modes simultaneously, even a small number of terminals support calling in both modes simultaneously, there is not any processing on the case of multiple CDMA or GSM/WCDMA calls, and the user experience is poor.

SUMMARY

The embodiment of the present document provides a dual-mode and dual-standby mobile terminal and a dual-channel implementation method thereof to overcome the problem that multiple calls in two modes cannot be supported in the related art.

The embodiment of the present document provide a dual-mode and dual-standby mobile terminal, comprising a first mode radio frequency transceiver, a second mode radio frequency transceiver, a first mode baseband chip connected to the first mode radio frequency transceiver, and a second mode baseband chip connected to the second mode radio frequency transceiver, and the mobile terminal further comprises:

a call processing module, connected to both the first mode baseband chip and the second mode baseband chip, and configured to perform fake call waiting on a call in active state in the first mode before proactively switching to the first call in the second mode when determining that there are two calls in the first mode, or before passively answering the second call in the second mode when determining that there are two calls in the first mode.

Preferably, the call processing module is configured to perform fake call waiting processing on the call in active state in the first mode, comprising: being configured to shield a call device of the call in active state in the first mode and insert a prompt tone in an uplink.

Preferably, the time length of playing the prompt tone is controlled by a timer.

Preferably, the call device comprises a microphone, a receiver and a speaker;

the call processing module is configured to shield the call device of the call in active state in the first mode, comprising: controlling the microphone not to transport collected audio data to the uplink of the call in active state in the first mode, and, controlling downlink data of the call in active state in the first mode not be transmitted to the receiver and the speaker.

Preferably, the call processing module is further configured to: after performing the fake call waiting processing on the call in active state in the first mode, if receiving a request for switching back to the call which is fake call waiting processed in the first mode, stop inserting the prompt tone in the uplink of the call which is fake call waiting processed in the first mode and restore the call device back to the call which is fake call waiting processed in the first mode.

Preferably, the call processing module is further configured to: shield the call device of the second call in the second mode, and insert the prompt tone in the uplink of the second call in the second mode.

Preferably, the first mode is a global system for mobile (GSM) mode, a wideband code division multiple access (WCDMA) mode or a Time Division Synchronous Code Division Multiple Access (TD-SCDMA) mode, and the second mode is a Code Division Multiple access (CDMA) mode; or, the first mode is the CDMA mode, and the second mode is the GSM mode, the WCDMA mode or the TD-SCDMA mode; or the first mode is the GSM mode and the second mode is the TD-SCDMA mode; or, the first mode is the TD-SCDMA mode and the second mode is the GSM mode.

The embodiment of the present document further provides a dual-channel implementation method for a dual-mode and dual-standby mobile terminal, and the dual-mode and dual-standby mobile terminal supports the first and second modes, and the method comprises:

the mobile terminal receiving two calls in the first mode, wherein the two calls in the first mode are respectively in hold state and in active state;

before proactively switching to the first call in the second mode or passively answering the second call in the second mode, the mobile terminal performing fake call waiting processing on the call in active state in the first mode.

Preferably, the mobile terminal performs fake call waiting processing on the call in activate state in the first mode, comprising:

the mobile terminal shielding a call device of the call in active state in the first mode, and inserting a prompt tone into the uplink of the call in active state in the first mode.

Preferably, the time length of playing the prompt tone is controlled by a timer.

Preferably, the call device comprises a microphone, a receiver and a speaker;

the mobile terminal shields the call device of the call in active state in the first mode, comprising: controlling the microphone not to transport collected audio data into the uplink of the call in active state in the first mode, and, controlling downlink data of the call in active state in the first mode not to be transmitted to the receiver or the speaker.

Preferably, after the mobile terminal performs fake call waiting processing on the call in active state in the first mode, the method further comprises:

the mobile terminal stopping inserting the prompt tone into the uplink of the call which is fake call waiting processed in the first mode when receiving a request for switching back to the call which is fake call waiting processed in the first mode, and restoring the call device back to the call which is fake call waiting processed in the first mode.

Preferably, the method further comprises: the mobile terminal shielding the call device of the second call in the second mode, and inserting the prompt tone into the uplink of the second call in the second mode.

Preferably, the first mode is a global system for mobile (GSM) mode, a wideband code division multiple access (WCDMA) mode or a Time Division Synchronous Code Division Multiple Access (TD-SCDMA) mode, and the second mode is a Code Division Multiple access (CDMA) mode; or, the first mode is the CDMA mode, and the second mode is the GSM mode, the WCDMA mode or the TD-SCDMA mode; or the first mode is the GSM mode, and the second mode is the TD-SCDMA mode; or, the first mode is the TD-SCDMA mode, and the second mode is the GSM mode.

In the embodiment of the present document, fake call waiting is achieved by the mobile terminal switching the call device and inserting a prompt tone in the uplink network, so as to achieve the dual-mode and dual-channel of multiple calls, and the implementation method is simple and efficient, and does not need to make any changes at the network side, does not increase the burden on the network system, and achieves the dual-mode and dual-channel in full sense.

PREFERRED EMBODIMENTS OF THE DOCUMENT

Hereinafter in conjunction with the accompanying drawings, the embodiments of the present document will be described in detail. It should be noted that, in the case of no conflict, the embodiments and features in the embodiments of the present application may be arbitrarily combined with each other.

The embodiment of the present document provides a dual-mode and dual-standby mobile terminal, comprising a first mode radio frequency transceiver, a second mode radio frequency transceiver, a first mode baseband chip connected to the first mode radio frequency transceiver, and a second mode baseband chip connected to with the second mode radio frequency transceiver, and the mobile terminal further comprises:

a call processing module, connected to both the first mode baseband chip and the second mode baseband chip, and configured to perform fake call waiting on a call in active state in the first mode before proactively switching to the first call in the second mode when determining that there are two calls in the first mode, or before passively answering the second call in the second mode when determining that there are two calls in the first mode.

Wherein, the call processing module is configured to perform fake call waiting processing on the call in active state in the first mode, comprising: being configured to shield the call device of the call in active state in the first mode and insert a prompt tone into the uplink.

Wherein, the first mode is the GSM mode, the WCDMA mode or the TD-SCDMA mode, and the second mode is the CDMA mode; or, the first mode is the CDMA mode, and the second mode is the GSM mode, the WCDMA mode or the TD-SCDMA mode; or the first mode is the GSM mode, and the second mode is the TD-SCDMA mode; or, the first mode is the TD-SCDMA mode, and the second mode is the GSM mode.

Figure 1:
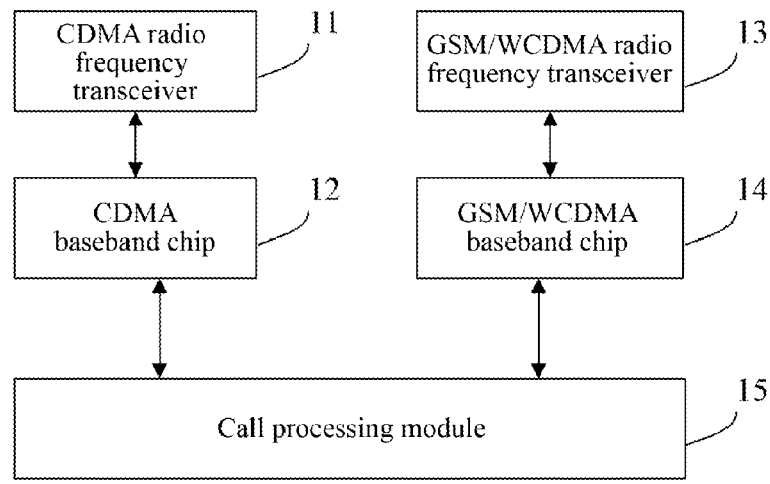
FIG. 1 is a schematic diagram of the structure of a dual-mode and dual-standby mobile terminal embodiment in accordance with an embodiment of the present document.

In the following, the CDMA and GSM/WCDMA are taken as an example to introduce the mobile terminal, the mobile terminal can simultaneously support multiple CDMA and GSM/WCDMA calls. The structure of the mobile terminal is shown in FIG. 1, comprising CDMA radio frequency 11, CDMA baseband chip 12, GSM/WCDMA radio frequency transceiver 13, GAM/WCDMA baseband chip 14 and call processing module 15. The focus of the present embodiment is the call processing module, and the call processing module is connected to both the first mode baseband chip and the second mode baseband chip, and configured to perform fake call waiting on a call in active state in the first mode before proactively switching to the first call in the second mode when determining that there are two calls in the first mode, or before passively answering the second call in the second mode when determining that there are two calls in the first mode.

It should be noted that the abovementioned first and second modes, as well as the first and second calls in either mode are relative.

For a dual-channel terminal having two sets of baseband chips and radio frequency transceivers, the dual-hold and dual-channel of one CDMA call and one GAM/WCDMA call are achievable in both signaling and terminal. Because the networks of both modes cannot support the simultaneous call waiting of two calls, for the case that there are two calls in either mode, the terminal performs fake call waiting processing on the call in active state (which assumes to be the first call) in the current mode if the user wants to switch to the call in the other mode. For the peer-end user and network, this call is still in progress. Implementing the fake call waiting involves two main technical points, one is the switch of the Mic/Receiver/Speaker, the Mic/Receiver/Speaker device function is completely shielded for the call in active state in the current mode, and the Mic/Receiver/Speaker device is only used by the active call in the other mode; the second is: when switching to the other mode, the current mode does not perform any action on the signaling level, only inserts a piece of prompt music, such as a sentence "your phone is on hold, please wait", into the uplink.

Wherein, switching to the call in the other mode comprises that the user proactively switches to the call in hold state in the other mode in the menu interface, or the user answers a new incoming call in the other mode.

Aiming to the fake call waiting, for the peer-end user and network, the fake call waiting processed call is still in progress, the uplink and downlink are completely normal, but the uplink is completely empty after the inserted prompt tone is sent, while the terminal can receive normally in the downlink, but data are always discarded before the call is restored, and the terminal does not send the downlink audio data to the Receiver and Speaker devices to process.

Wherein, the switching and shielding of the abovementioned Mic/Receiver/Speaker device refers to that, for the call in active state in the current mode, the audio data collected by the Mic are not transmitted into the uplink of the call, and the downlink data are not transmitted to the Receiver or Speaker device. In this case, the Mic/Receiver/Speaker device only works as the dedicated device of the active call in the other mode.

In addition, the prompt music inserted in the uplink network is controlled to play by a timer, for example, a timer of 5 seconds or 10 seconds can be set, after the timer expires, the playing is stopped. If the user switches back to the original mode within the time period when the timer does not expire, the music is stopped inserting in the uplink network, the Mic/Receiver/Speaker device is restored to the original call, and the terminal normally continues the first call in the current first mode.

It can be seen that, the abovementioned dual-mode and dual-standby mobile terminal having two sets of baseband and radio frequency chips can use the terminal side's own fake call waiting processing to easily achieve full dual active and hold of multiple CDMA calls and multiple GSM/WCDMA calls in full sense without making any changes at the network side.

Figure 2:
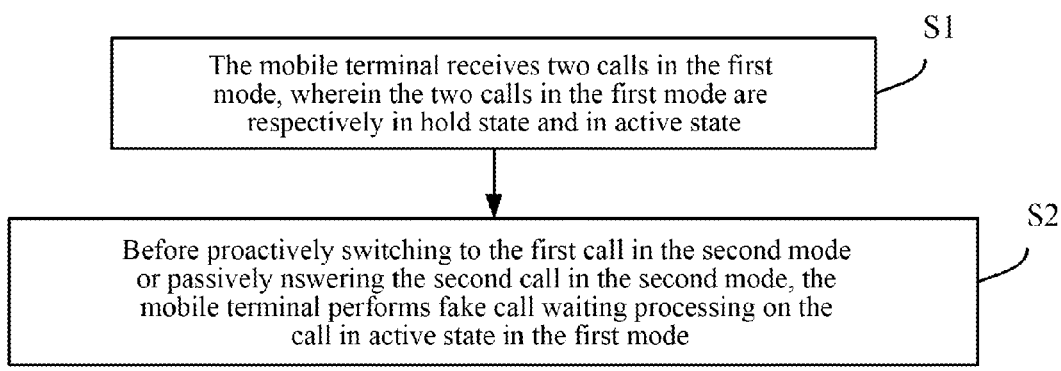
FIG. 2 is a flow chart of a dual-channel implementation method for the dual-mode and dual-standby mobile terminal in accordance with an embodiment of the present document.

As shown in FIG. 2, the embodiment of the present document further provides a dual-channel implementation method for the dual-mode and dual-standby mobile terminal, wherein the dual-mode and dual-standby mobile terminal supports the first and second modes, and the method comprises:

S1, the mobile terminal receives two calls in the first mode, wherein the two calls in the first mode are respectively in hold state and in active state;

wherein, the first mode is the GSM mode, the WCDMA mode or the TD-SCDMA mode, and the second mode is the CDMA mode; or, the first mode is the CDMA mode, and the second mode is the GSM mode, the WCDMA mode or the TD-SCDMA mode; or, the first mode is the GSM mode, and the second mode is the TD-SCDMA mode; or, the first mode is the TD-SCDMA mode, and the second mode is the GSM mode, and so on.

S2, before proactively switching to the first call in the second mode or passively answering the second call in the second mode, the mobile terminal performs fake call waiting processing on the call in active state in the first mode.

The mobile terminal performs fake call waiting processing on the call in active state in the first mode, comprising: the mobile terminal shielding the call device of the call in active state in the first mode, and inserting the prompt tone in the uplink of the call in active state in the first mode.

In addition, after the mobile terminal performs fake call waiting processing on the call in active state in the first mode, the method further comprises: the mobile terminal stopping inserting the prompt tone into the uplink of the call which is fake call waiting processed in the first mode after receiving the request for switching back to the call which is fake call waiting processed in the first mode, and restoring the call device back to the call which is fake call waiting processed in the first mode. Furthermore, the mobile terminal may also shield the call device of the second call in the second mode, and insert the prompt tone into the uplink of the second call in the second mode.

In the following, the CDMA mode and the GSM mode are taken as an example to describe the process of the mobile terminal shown in FIG. 1 achieving the dual-channel.

Figure 3:
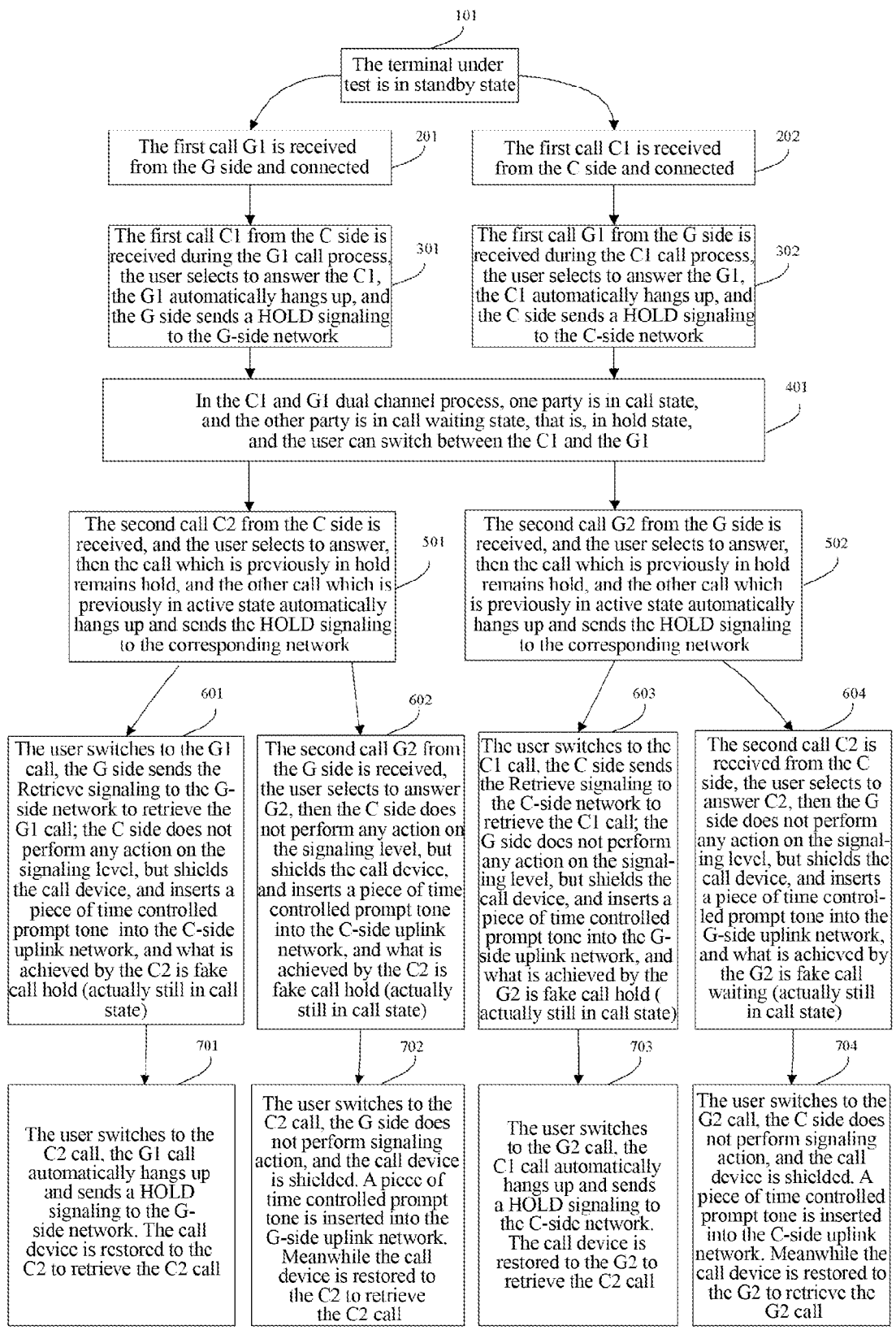
FIG. 3 is a flow chart of a dual-channel implementation method embodiment for the dual-mode and dual-standby mobile terminal in accordance with an embodiment of the present document.

FIG. 3 shows a flow chart of the dual-channel implementation method embodiment for the dual-mode and dual-standby mobile terminal in accordance with an embodiment of the present document, and in the embodiment, the delivering step is divided into two separate parts to describe in detail (C represents CDMA, and G represents GSM).

Wherein, the first part comprises the following steps.

In step 101, the terminal under test is in standby state; the terminal can be connected when there is an incoming call from C or G.

In step 201, the first call G1 is received from the G side and connected, since the G-side network can support up to six calls, the G1 can be broadly understood as a six-party conference call with up to 5 lines.

In step 301, the first call C1 from the C side is received during the G1 call process, the user selects to answer the C1, the G1 automatically hangs up, and the G side sends a HOLD command to the G-side network.

In step 401, this step is a state supplementary description of the step 301, it is currently in the C1 and G1 dual channel and hold process, the C1 is in call state, and the G1 is in call waiting state, that is, hold state. The user can switch between the C1 and the G1 in such state. If the user wants to switch from the C1 call to the G1, the G side sends a Retrieve command to the G-side network, the C1 automatically hangs up, and the C side sends a HOLD command to the C-side network, thus retrieving the call between the terminal and the G1.

In step 501, the second call C2 is received from the C side, and the user selects to answer, then the G1 remains hold, the C1 automatically hangs up and sends the HOLD command to the C-side network; if the user proactively initiates the C2 to perform a three-party call after the step 401, the terminal, the C1 and the C2 enter into three-party call state together, and the G1 maintains hold.

In step 601, if the user switches to the G1 call in the step 501, then the G side sends the Retrieve command to the G-side network to retrieve the call between the terminal and the G1; the C side does not perform any action on the signaling level, only shields the Mic/Receiver/Speaker device, and inserts a piece of prompt music controlled by a timer into the C-side uplink network, at this time what is achieved by the C2 is fake call waiting (actually still in call state). If the C1 and the C2 are in a three-party call in the step 501, then the G and C sides still perform the same operation if the user switches to the G1 call, except that the three-party call previously performed by the C1 and the C2 enters into the fake call waiting; proceed to step 701.

In step 602, if the terminal receives the second call G2 from the G side in step 501, the user selects to answer, then the G1 remains hold; the C side does not perform any action on the signaling level, only shields the Mic/Receiver/Speaker device, and inserts a piece of prompt music controlled by a timer into the C-side uplink network, at this time what is achieved by the C2 is fake call waiting (actually still in call state). If the C1 and the C2 are in a three-party call in step 501, then the G and C sides still perform the same operation if the user selects to answer the G2, except that the three-party call previously performed by the C1 and the C2 enters into the fake call waiting; proceed to step 702.

In step 701, the user switches to the C-side call in step 601, the G1 call automatically hangs up and sends a HOLD command to the G-side network, restores the Mic/Receiver/Speaker device to the C2 call or the C1 and C2 three-party call to retrieve the C-side call.

In step 702, the user switches to the C-side call in step 602, the G1 call at the G side remains hold, there is no signaling action on the network level, the Mic/Receiver/Speaker device for the G2 is shielded, and a piece of prompt music controlled by a timer is inserted into the G-side uplink network, while the Mic/Receiver/Speaker device is restored to the C side to retrieve the C2 call or the C1 and C2 three-party call.

Wherein, the second part comprises the following steps.

In step 101, the terminal under test is in standby mode; the terminal can be connected when there is an incoming call from C or G.

In step 202, the first call C1 is received from the C side and connected.

In step 302, the first call G1 from the G side is received during the C1 call process, the user selects to answer the G1, the C1 automatically hangs up, and the C side sends a HOLD command to the C-side network; since the G-side network can support up to six calls, the G1 can be broadly understood as a six-party conference call with up to 5 lines.

In step 401, this step is a state supplementary description of the step 302, it is currently in the C1 and G1 dual active and hold process, the G1 is in call state, and the C1 is in call waiting state, that is, hold state. The user in such state is able to switch between the C1 and the G1. If the user wants to switch from the G1 call to the C1, the C side sends a Retrieve command to the C-side network, the G1 automatically hangs up, the G side sends a HOLD command to the G-side network to retrieve the call between the terminal and the C1.

In step 502, the second (or sixth) call G2 is received from the G side, and the user selects to answer, then the C1 remains hold, the G1 automatically hangs up and sends the HOLD command to the G-side network; if the user proactively initiates the C-side conference call after the step 401, the multiple calls between the terminal and the G side enter into the multi-party call state together, and the C1 maintains hold.

In step 603, if the user switches to the C1 call in step 502, then the C side sends a Retrieve command to the C-side network to retrieve the call between the terminal and the C1; the G side does not perform any action on the signaling level, only shields the Mic/Receiver/Speaker device, and inserts a piece of prompt music controlled by a timer into the G-side uplink network, at this time what is achieved by the G2 is fake call waiting (actually still in call state); if the G-side call is a multi-party call in step 502, then the G and C sides still perform the same operation if the user switches to the C1 call, except that the previous G-side conference call enters into the fake call waiting; then proceed to step 703.

In step 604, if the terminal receives the second call C2 from the C side after step 502, the user selects to answer, then the C1 remain hold; the G side does not perform any action on the signaling level, only shields the Mic/Receiver/Speaker device, and inserts a piece of prompt music controlled by the timer into the G-side uplink network, at this time what is achieved by the G2 is fake call waiting (actually still in the call state). If the G-side call is a multi-party conference call in step 502, then the G and C sides still perform the same operation if the user selects to answer the C2 call, except that the previous G-side multi-party conference call enters into fake call waiting; then proceed to step 704.

In step 703, the user switches to the G-side call in step 603, the C1 call automatically hangs up and sends a HOLD command to the C-side network, and the Mic/Receiver/Speaker device is restored to the G2 call or the G-side multi-party call to retrieve the G-side call.

In step 704, the user switches to the G-side call in step 604, the C1 call at the C side remains hold, there is no signaling action on the network level, the Mic/Receiver/Speaker device for the C2 is shielded, and a piece of prompt music controlled by the timer is inserted into the C-side uplink network, meanwhile the Mic/Receiver/Speaker device is restored to the C side to retrieve the G2 call or the multi-party call at the G side.

The abovementioned dual-channel implementation for the dual-mode and dual-standby mobile terminal achieves fake call waiting by the mobile terminal switching the Mic/Receiver/Speaker device and inserting prompt music in the uplink network, so as to achieve the dual-mode and dual-channel of multiple calls, and the implementation method is simple and efficient, does not need to make any changes at the network side, does not increase the burden on the network system, and achieves the dual-mode and dual-channel in full sense.

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above embodiments are merely used to describe rather than limit the technical scheme of the present document, and the present document is just described in detail with reference to the preferred embodiments. Those ordinarily skilled in the art should appreciate that the technical scheme of the present document can have modifications or equivalent replacements, and without departing from the spirit and scope of the technical scheme of the present document, these modifications and equivalent replacements shall be covered in the claims of the present document.

INDUSTRIAL APPLICABILITY

In the embodiment of the present document, the mobile terminal is used to switch the call device and insert a prompt tone in the uplink network, to achieves fake call waiting and thus achieving the dual-mode and dual-channel of multiple calls, the implementation method is simple and efficient, does not need to make any changes at the network side, does not increase the burden on the network system, and achieves the dual-mode and dual-channel in full sense.

What is claimed is:

1. A dual-mode and dual-standby mobile terminal, comprising a first mode radio frequency transceiver, a second mode radio frequency transceiver, a first mode baseband chip connected to the first mode radio frequency transceiver, and a second mode baseband chip connected to the second mode radio frequency transceiver, wherein the mobile terminal further comprises:
a call processing module, connected to both the first mode baseband chip and the second mode baseband chip, and configured to perform fake call waiting processing on a call in active state in a first mode, before proactively switching to a first call in a second mode when determining that there are two calls in the first mode, or before passively answering a second call in the second mode when determining that there are two calls in the first mode,
wherein the call processing module is configured to perform fake call waiting processing on the call in active state in the first mode, by being configured to shield a call device of the call in active state in the first mode, and insert a prompt tone in an uplink, wherein a time length of playing the prompt tone is controlled by a timer, after the timer expires, playing the prompt tone is stopped.

2. The mobile terminal of claim 1, wherein:
the call device comprises a microphone, a receiver and a speaker;
the call processing module is configured to shield the call device of the call in active state in the first mode, comprising: controlling the microphone not to transport collected audio data into the uplink of the call in active state in the first mode, and, controlling downlink data of the call in active state in the first mode not to be transmitted to the receiver and the speaker.

3. The mobile terminal of claim 1, wherein:
the call processing module is further configured to: after performing the fake call waiting processing on the call in active state in the first mode, if receiving a request for switching back to the call which is fake call waiting processed in the first mode, stop inserting the prompt tone in the uplink of the call which is fake call waiting processed in the first mode and restore the call device back to the call which is fake call waiting processed in the first mode.

4. The mobile terminal of claim 3, wherein:
the call processing module is further configured to: shield the call device of the second call in the second mode, and insert the prompt tone in the uplink of the second call in the second mode.

5. The mobile terminal of claim 4, wherein:
the first mode is a global system for mobile (GSM) mode, a wideband code division multiple access (WCDMA) mode or a Time Division Synchronous Code Division Multiple Access (TD-SCDMA) mode, and the second mode is a Code Division Multiple access (CDMA) mode; or, the first mode is the CDMA mode, and the second mode is the GSM mode, the WCDMA mode or the TD-SCDMA mode; or
the first mode is the GSM mode and the second mode is the TD-SCDMA mode; or, the first mode is the TD-SCDMA mode and the second mode is the GSM mode.

6. The mobile terminal of claim 1, wherein:
the call processing module is further configured to: after performing the fake call waiting processing on the call in active state in the first mode, if receiving a request for switching back to the call which is fake call waiting processed in the first mode, stop inserting the prompt tone in the uplink of the call which is fake call waiting processed in the first mode and restore the call device back to the call which is fake call waiting processed in the first mode.

7. The mobile terminal of claim 2, wherein:
the call processing module is further configured to: after performing the fake call waiting processing on the call in active state in the first mode, if receiving a request for switching back to the call which is fake call waiting processed in the first mode, stop inserting the prompt tone in the uplink of the call which is fake call waiting processed in the first mode and restore the call device back to the call which is fake call waiting processed in the first mode.

8. A dual-channel implementation method for a dual-mode and dual-standby mobile terminal, wherein the dual-mode and dual-standby mobile terminal supports a first mode and a second mode and the method comprises:
the mobile terminal receiving two calls in the first mode, wherein the two calls in the first mode are respectively in hold state and in active state;
before proactively switching to a first call in the second mode or passively answering a second call in the second mode, the mobile terminal performing fake call waiting processing on the call in active state in the first mode, comprising: the mobile terminal shielding a call device of the call in active state in the first mode, and inserting a prompt tone into an uplink of the call in active state in the first mode, wherein a time length of playing the prompt tone is controlled by a timer, after the timer expires, playing the prompt tone is stopped.

9. The method of claim 8, wherein:
the call device comprises a microphone, a receiver and a speaker;
the mobile terminal shields the call device of the call in active state in the first mode, comprising: controlling the microphone not to transport collected audio data into the uplink of the call in active state in the first mode, and, controlling downlink data of the call in active state in the first mode not to be transmitted to the receiver or the speaker.

10. The method of claim 8, wherein: after the mobile terminal performs fake call waiting processing on the call in active state in the first mode, the method further comprises:

the mobile terminal stopping inserting the prompt tone into the uplink of the call which is fake call waiting processed in the first mode when receiving a request for switching back to the call which is fake call waiting processed in the first mode, and restoring the call device back to the call which is fake call waiting processed in the first mode.

11. The method of claim 10, wherein: the method further comprises:

the mobile terminal shielding the call device of the second call in the second mode, and inserting the prompt tone into the uplink of the second call in the second mode.

12. The method of claim 11, wherein:

the first mode is a global system for mobile (GSM) mode, a wideband code division multiple access (WCDMA) mode or a Time Division Synchronous Code Division Multiple Access (TD-SCDMA) mode, and the second mode is a Code Division Multiple access (CDMA) mode; or, the first mode is the CDMA mode, and the second mode is the GSM mode, the WCDMA mode or the TD-SCDMA mode; or the first mode is the GSM mode, and the second mode is the TD-SCDMA mode; or, the first mode is the TD-SCDMA mode, and the second mode is the GSM mode.

13. The method of claim 8, wherein: after the mobile terminal performs fake call waiting processing on the call in active state in the first mode, the method further comprises:

the mobile terminal stopping inserting the prompt tone into the uplink of the call which is fake call waiting processed in the first mode when receiving a request for switching back to the call which is fake call waiting processed in the first mode, and restoring the call device back to the call which is fake call waiting processed in the first mode.

14. The method of claim 9, wherein: after the mobile terminal performs fake call waiting processing on the call in active state in the first mode, the method further comprises:

the mobile terminal stopping inserting the prompt tone into the uplink of the call which is fake call waiting processed in the first mode when receiving a request for switching back to the call which is fake call waiting processed in the first mode, and restoring the call device back to the call which is fake call waiting processed in the first mode.

\* \* \* \* \*